US010273026B2

United States Patent
Viel et al.

(10) Patent No.: US 10,273,026 B2
(45) Date of Patent: *Apr. 30, 2019

(54) ROBOTIZED TRANSPORT AND TRANSFER SYSTEM

(71) Applicant: PREMIER TECH TECHNOLOGIES LTÉE, Riviére-du-Loup (CA)

(72) Inventors: Éric Viel, Riviére-du-Loup (CA); Vital Lévesque, Riviére-du-Loup (CA); Étienne Giasson, Riviére-du-Loup (CA)

(73) Assignee: PREMIER TECH TECHNOLOGIES LTEE, Riviere-du-Loup, Quebec (CA)

( * ) Notice: Subject to any disclaimer, the term of this patent is extended or adjusted under 35 U.S.C. 154(b) by 369 days.

This patent is subject to a terminal disclaimer.

(21) Appl. No.: 15/249,520

(22) Filed: Aug. 29, 2016

(65) Prior Publication Data

US 2016/0368637 A1    Dec. 22, 2016

Related U.S. Application Data

(63) Continuation of application No. 13/518,601, filed as application No. PCT/CA2010/001940 on Dec. 6, 2010, now Pat. No. 9,452,851.

(Continued)

(51) Int. Cl.
*B25J 9/00*    (2006.01)
*B65B 1/00*    (2006.01)
(Continued)

(52) U.S. Cl.
CPC ........... *B65B 43/465* (2013.01); *B25J 9/0093* (2013.01); *B65B 1/00* (2013.01); *B65B 7/02* (2013.01);
(Continued)

(58) Field of Classification Search
CPC .... B65B 1/00; B65B 7/02; B65B 7/06; B65B 43/465; B65B 43/59; B65B 51/07;
(Continued)

(56) References Cited

U.S. PATENT DOCUMENTS 539,455 A    5/1895    Timewell
548,029 A    10/1895    Bibb et al.
(Continued)

FOREIGN PATENT DOCUMENTS

AU    5754994 A    9/1994
DE    3221061 A1    12/1983
(Continued)

OTHER PUBLICATIONS

European Search Report for Application No. 10838449.6 dated Sep. 27, 2013, 7 pages.
(Continued)

*Primary Examiner* — Stephen F. Gerrity
(74) *Attorney, Agent, or Firm* — Eversheds Sutherland (US) LLP

(57) ABSTRACT

A system and a method for maintaining, transferring and transporting a flexible package. The system includes a manipulating system, preferably a five axis robot, for transferring and displacing the flexible package and a lift-assist platform positioned within a reach of the manipulating system for transporting the package and for supporting a weight of the flexible package. The system may be used more specifically for the transport and transfer of upright flexible packages. The system simplifies the tool supported by the robot, thus allowing use of a smaller robot.

18 Claims, 8 Drawing Sheets

Related U.S. Application Data

(60) Provisional application No. 61/288,954, filed on Dec. 22, 2009.

(51) Int. Cl.
  *B65B 7/02* (2006.01)
  *B65B 7/06* (2006.01)
  *B65B 43/46* (2006.01)
  *B65B 43/59* (2006.01)
  *B65B 51/07* (2006.01)
  *B65G 47/90* (2006.01)

(52) U.S. Cl.
  CPC .............. *B65B 7/06* (2013.01); *B65B 43/59* (2013.01); *B65B 51/07* (2013.01); *B65G 47/905* (2013.01)

(58) Field of Classification Search
  CPC .......... B65G 47/905; B65G 2201/0238; B25J 9/046; B25J 9/0093; G05B 19/4182; D05B 13/02
  USPC .......... 53/418, 469, 480, 481, 138.5, 284.7, 53/372.4; 112/11; 198/345.1, 435, 198/836.1, 861.1; 414/222.01, 222.12, 414/225.01, 226.02, 729; 901/2, 7, 15, 901/18
  See application file for complete search history.

(56) References Cited

U.S. PATENT DOCUMENTS

| | | | |
|---|---|---|---|
| 562,438 A | 6/1896 | Timewell | |
| 609,809 A | 7/1898 | Timewell | |
| 2,164,502 A | 7/1939 | Cundall et al. | |
| 2,378,920 A | 6/1945 | Gillican | |
| 2,757,894 A | 8/1956 | Kindseth | |
| 3,241,290 A | 3/1966 | Ingleson et al. | |
| 3,559,372 A | 2/1971 | Cerioni | |
| 3,755,986 A | 9/1973 | Hudson | |
| 3,822,527 A | 7/1974 | Germunson et al. | |
| 3,990,216 A | 11/1976 | Martin | |
| 4,074,507 A | 2/1978 | Ruf et al. | |
| 4,137,855 A | 2/1979 | MacClusky | |
| 4,510,736 A | 4/1985 | Muller | |
| 4,704,845 A | 11/1987 | Bruno | |
| 5,398,484 A | 3/1995 | Kader | |
| 5,448,879 A * | 9/1995 | Concetti | B65B 1/02 53/284.7 |
| 5,845,467 A * | 12/1998 | Guardiola | B65B 43/465 53/571 |
| 5,878,553 A | 3/1999 | Schlosser | |
| 6,189,293 B1 | 2/2001 | Kraft et al. | |
| 6,371,717 B1 | 4/2002 | Grams et al. | |
| 6,401,439 B1 | 6/2002 | Tetenborg et al. | |
| 7,309,203 B2 | 12/2007 | Clark et al. | |
| 9,452,851 B2 * | 9/2016 | Viel et al. | B65B 7/06 |
| 2003/0019541 A1 | 1/2003 | Bassi | |
| 2004/0237473 A1 | 12/2004 | Basque | |
| 2005/0150570 A1 | 7/2005 | Levesque | |
| 2007/0294982 A1 | 12/2007 | Knoke et al. | |
| 2009/0241487 A1 | 10/2009 | Actis | |
| 2010/0192524 A1 | 8/2010 | Rapparini | |

FOREIGN PATENT DOCUMENTS

| | | | |
|---|---|---|---|
| DE | 3713571 A1 | | 11/1988 |
| EP | 0001686 A1 | | 5/1979 |
| EP | 2132093 B1 | | 1/2011 |
| FR | 2320869 A1 | | 3/1977 |
| FR | 2377327 A1 | | 8/1978 |
| FR | 2476021 A1 | | 8/1981 |
| GB | 2196313 A | * | 4/1988 |
| JP | 52037184 A | | 3/1977 |
| JP | 01213122 A | | 8/1989 |
| WO | 2008114113 A1 | | 9/2008 |
| WO | 2008116638 A1 | | 10/2008 |
| WO | 2009146553 A1 | | 12/2009 |

OTHER PUBLICATIONS

Chinese Office Action for Application No. 201080059100.1 dated Dec. 4, 2013, 9 pages.

* cited by examiner

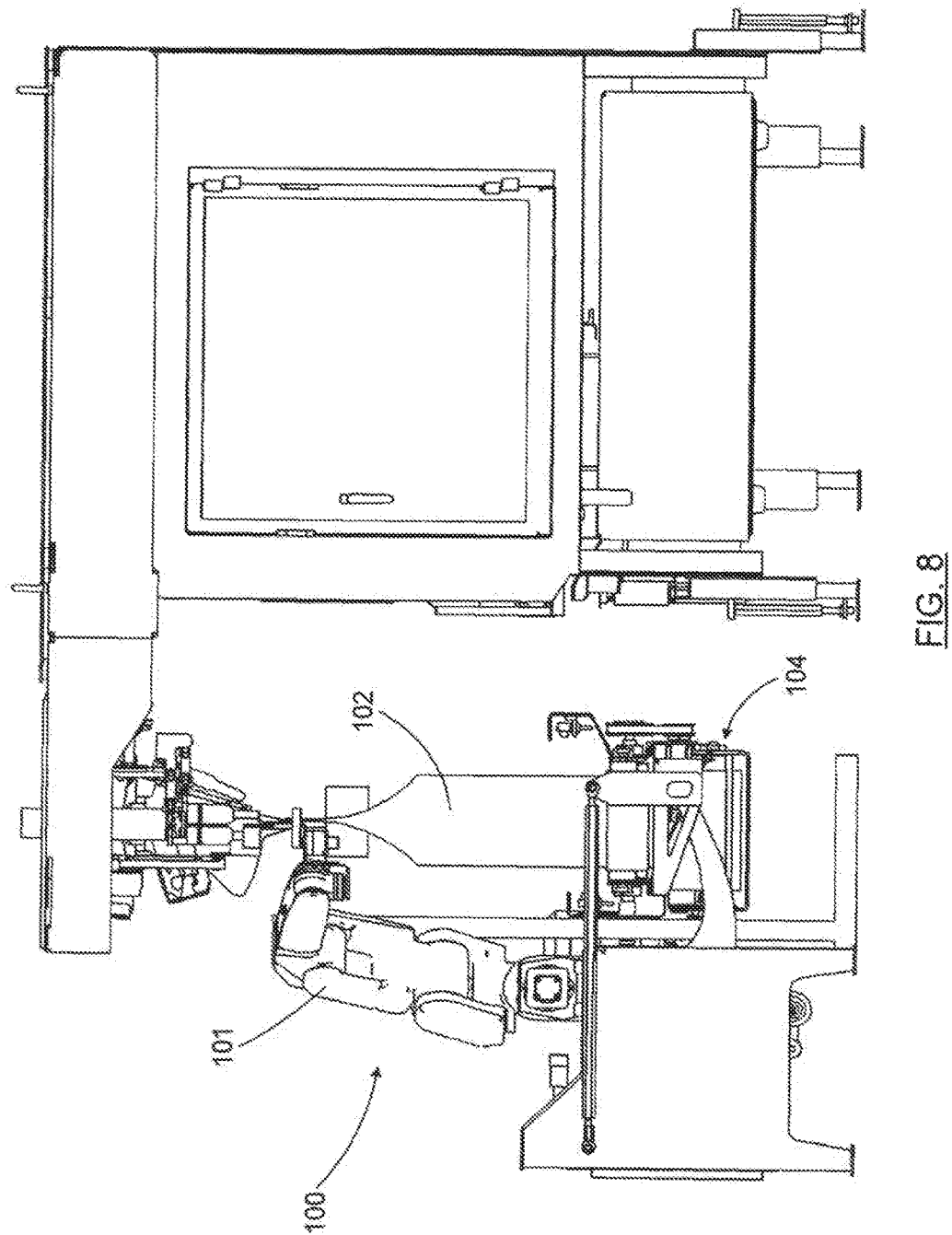

ROBOTIZED TRANSPORT AND TRANSFER SYSTEM

CROSS-REFERENCE TO RELATED APPLICATIONS

This is a continuation of U.S. application Ser. No. 13/518,601, which is the U.S. national stage of PCT/CA2010/001940, filed Dec. 6, 2010, which claims priority to U.S. Provisional Patent Application No. 61/288,954 filed Dec. 22, 2009. Those applications are incorporated herein by reference.

FIELD OF THE INVENTION

The present invention generally relates to packaging systems. More particularly, the present invention relates to a system for transporting and transferring items, including among others, upright flexible packages.

BACKGROUND OF THE INVENTION

In many fields of the packaging industry, such as pet food, stock feed, seeds, etc., multi-wall gusseted paper bags are heavily used. Producers can choose from manual baggers, semi-automatic baggers or fully automated baggers. Baggers are understood to comprise at least some of the following subsystems: a bag magazine, a bag dispenser, a bag placer, a filling spout, an exit unit, a bag reshaper and a sealer. A bagger may or may not include a closing system.

No matter the type of bagger used, the bagging operation for the previously mentioned types of product is similar. On semi-automatic and fully automatic baggers, the bag dispenser places the bag on the filling spout, whereas manual baggers require the action of an operator to place a bag on the spout.

On automatic baggers, the gussets or the side folds of the bag are preferably maintained closed (in their original shape when the bag is empty and flat) while the bag is on the spout. Otherwise, a system has to reshape them. Reshaping is understood to be the action of bringing the flaps of the top of the bag together and re-folding the gussets or the side folds of the bag. While the shape of the top portion of the bag is being maintained thoroughly, the bag is then removed from the spout and transferred to the closing system. For manual and semi-automatic baggers, reshaping systems on the spout would be useless since they release the bag from the spout and let it fall on a conveyor, losing control of the bag shape. Therefore, the use of a system reshaping the gussets or side folds while the bag travels towards the closing system (called in-line reshaping system) is necessary, otherwise an operator needs to reshape the top of the bag and transfer it to the closing system. Correctly shaped gussets or side folds improve closing quality, bag appearance and produce bags that are easier to palletize.

Several criteria must be taken into account when searching for the more suitable bagger for the very precise needs of a typical application. Undoubtedly, any factory manager will opt for the best solution at the lowest price. The most important criteria are certainly the cost of the machine, its reliability, productivity, complexity, footprint and modularity (retrofitable), the safety related to the machine and the quality of the result (finished bag).

Manual baggers are the least expensive to purchase; however they are often associated with recurring costs such as operator salaries and insurance. The quality of the finished product is average to good, but it can be affected by different factors, such as operator exhaustion and lack of time to readjust the fold since the machine keeps running at a fixed pace. Manual baggers are more suitable for production rates around 15 to 20 bags per minute. As for manual baggers safety issues, operators' safety and ergonomics must be taken into account. On the other hand, they use minimal floor space.

Semi-automatic baggers are more expensive to purchase (around 2 to 3 times more expensive than the manual baggers). The bag reshaping quality is average to low since the spout is fixed and the bag falls from the spout, resulting in no bag control and hand-reformed bags. As with the manual baggers, the bag is reshaped by an operator who can be subject to the same factors expressed for manual baggers. Semi-automatic baggers can also reach an average productivity rate of 15 to 20 bags per minute. They can be retrofitted with in-line reshaping systems which automate the reshaping of the bag while it travels toward the closing system. In-line reshaping systems are quite expensive (it can cost the amount of the semi-automatic bagger itself) and give low quality results. As for reliability issues, due to their complex mechanical construction, these systems have an average to low mechanical reliability.

Fully automated baggers are the most expensive systems to purchase (around 4 to 6 times more expensive than the manual baggers). Large producers can afford this kind of machine which offers even more benefits to producers bagging large batches and high value end product. Automatic systems can reach an average productivity rate of 20 to 30 bags per minute. These fully automated baggers have quite complex mechanical systems and use more floor space than manual or semi-automatic baggers.

The most effective solution is obviously the completely automated bagger, but this option is also the most expensive and, for that reason, is not affordable and suitable for the majority of producers which must turn towards manual or semi-automatic systems. The manual and semi-automatic baggers are cheaper to purchase and can be retrofitted with an in-line reshaping system, but still, they will operate with limited productivity and quality. Considering the proportion of producers who use manual and semi-automatic baggers and those who increment their system with additional automation, it represents a large potential for machine sales.

The critical point is the system transferring the bag from the bagger to the closing system since it influences the bagger productivity and the quality of the finished product. The use of dedicated in-line reshaping systems increase bagger productivity, but decrease the quality of the product. Up to now, in the targeted fields such as pet food, stock feed, seeds, etc., of the packaging industry, there appears to be no small, low cost, high quality, high productivity, reliable, retrofitable system available capable of maintaining the shape of the top portion of the bag, transferring and transporting the bag from the bagger to a closing system. Hereinbelow, it is understood that the term "transport" encompasses a displacement of an item while properly supporting its weight during the displacement. The term "displacing" encompasses a displacement of an item between a point A and a point B. The term "transferring" encompasses a transfer and passage of an item between a first system carrying out operations on the item and a second system carrying out operations on the item Some references show reshaping systems positioned on the machine spout. It would be possible for someone, well educated in this technical field and aware of prior art, to logically think of a system capable of taking the bag while it is being closed and maintaining its state until the closing of the bag is completed. A dedicated mechanical system would be quite easy to develop but would be cumbersome, hardly retrofitable, complex and expensive. The final solution would be very close to the existing automated baggers but with the disadvantages of having two machines not well integrated and almost as much expensive.

Another way of transferring the bag once it has been reshaped on the spout would be to use a robot to maintain the bag reshaped and transport it to the closing system. A robot capable of supporting the filled bag weight and moving it at the requested speed to achieve acceptable production rates (20 bags per minute minimum) would be too large to be well integrated on an existing bagger and would cost as much as an automated bagger. There are existing applications, frequently used in valve bagging applications, where a robot manipulates a filled bag from the bagger to the closing system, but this has never been done to be suitable for gusseted open mouth bags and sewing systems. These applications typically use a big six-axis robot.

Therefore, there is still a need for a system to automate manual and semi-automatic baggers, thereby improving their productivity and the quality of the finished bags. The preferable solution would be a small, low cost, high quality, high productivity, reliable, retrofittable system to maintain the shape of the top of the bag, while transporting and transferring the bag from the bagger to a closing system.

SUMMARY OF THE INVENTION

An object of the present invention is to provide a system that addresses at least one of the above-mentioned needs.

According to the present invention, there is provided a system for transferring and transporting a flexible package, the system comprising:
  a multi-axis robot for transferring and displacing the flexible package between a first position and a second position; and
  a lift-assist platform for transporting the flexible package, said lift-assist platform substantially supporting a weight of the flexible package, said lift-assist platform comprising a displacing system for displacing and supporting the flexible package upright between the first and second positions, the platform being positioned within reach of the multi-axis robot.

Preferably, the multi-axis robot, in certain configurations, maintains the flexible package between the first position and the second position.

Preferably, the system further comprises a single central controller for synchronizing motion of the multi-axis robot and the lift-assist platform.

Preferably, the multi-axis robot is a five axis robot.

Preferably, the multi-axis robot comprises a gripper continuously maintaining a shape of at least a portion of a top of the flexible package between the first and second positions.

Preferably, the gripper comprises opposite side clamps for grasping the flexible package.

Preferably, the system further comprises a semi-automatic bagger proximate the first position for filling the upright flexible package and shaping a top portion of the package, and a closing system positioned proximate the second position for closing the package received from the multi-axis robot.

Preferably, the displacing system is a conveyor system.

According to the present invention, there is also provided a method for transferring and transporting a flexible package, comprising the steps of:

a) providing a system comprising:
    a multi-axis robot for transferring and displacing the flexible package between a first position and a second position;
    a lift-assist platform for transporting the flexible package, said lift-assist platform substantially supporting a weight of the flexible package, said lift-assist platform comprising a displacing system for displacing and supporting the flexible package upright between the first and second positions, the platform being positioned within reach of the multi-axis robot;
    a semi-automatic bagger proximate the first position for filling the upright flexible package; and
    a closing system positioned proximate the second position;
  b) filling the flexible package with a substance, using the semi-automatic bagger;
  c) bringing together sidewalls of a top of the filled flexible package in a package-closing configuration with the semi-automatic bagger;
  d) raising the lift-assist platform to substantially support the weight of the filled flexible package;
  e) grasping and maintaining a shape of the top of the filled flexible package in said package-closing configuration with the multi-axis robot;
  f) releasing the filled flexible package from the semi-automatic bagger;
  g) displacing the filled flexible package towards an inlet of the closing system, through synchronized motion of the multi-axis robot and the lift-assist platform, the displacing system of the lift-assist platform displacing the flexible package laterally towards the closing system;
  h) aligning the top of the flexible package with the inlet of the closing system; and
  i) transferring the flexible package from the multi-axis robot to the closing system.

Preferably, the present invention is a system capable of transferring a filled bag, maintaining it in a package-closing configuration and vertical, supporting its weight and transporting it from the bagger to a closing system.

These actions require force and dexterity. Since these actions cannot be carried out by a system other than a big, strong and complex robot, the solution is to separate the actions requiring force from those requiring dexterity. The present invention uses the robot dexterity, but not its strength, thereby allowing the use of a smaller robot which is not strong enough to support the bag weight on its own. Thus, the robot is used to perform dexterous actions such as maintaining the gusset or side folds closed, maintaining the bag verticality and guiding the bag into the closing system. The use of a small robot is achievable since the weight of the bag is supported by the platform which preferably comprises a conveyor, so the robot arm does not have to support the weight of the bag. The support actions which require force, such as bag weight support and bag transfer to the closing system, are performed separately by the conveyor. The bag is transferred to the closing system by synchronous motion of the conveyor belt, vertical motion of the conveyor and 3-D motion of the robot. No load from the bag weight is supported by the robot. Vertical motion and belt driving of the conveyor (powered by servomotors) are controlled by the robot, enabling synchronization of movements.

The reshaping action is performed by the bagger, on the spout, which provides a high quality gusset or side fold and simplifies the tool supported by the robot, thus allowing use of a small robot.

The present invention combines many interesting advantages: use of a small robot, small required footprint (almost a smaller footprint than for manual applications), and easily retrofittable. Furthermore, robots are well known in the industry for their exceptional reliability and safety of operation.

BRIEF DESCRIPTION OF THE DRAWINGS

These and other objects and advantages of the invention will become apparent upon reading the detailed description, provided merely by way of non-limitative examples, and upon referring to the drawings in which:

FIG. 8 is a right side view of the system shown in FIG. 1.

DETAILED DESCRIPTION OF PREFERRED EMBODIMENTS

Figure 1:
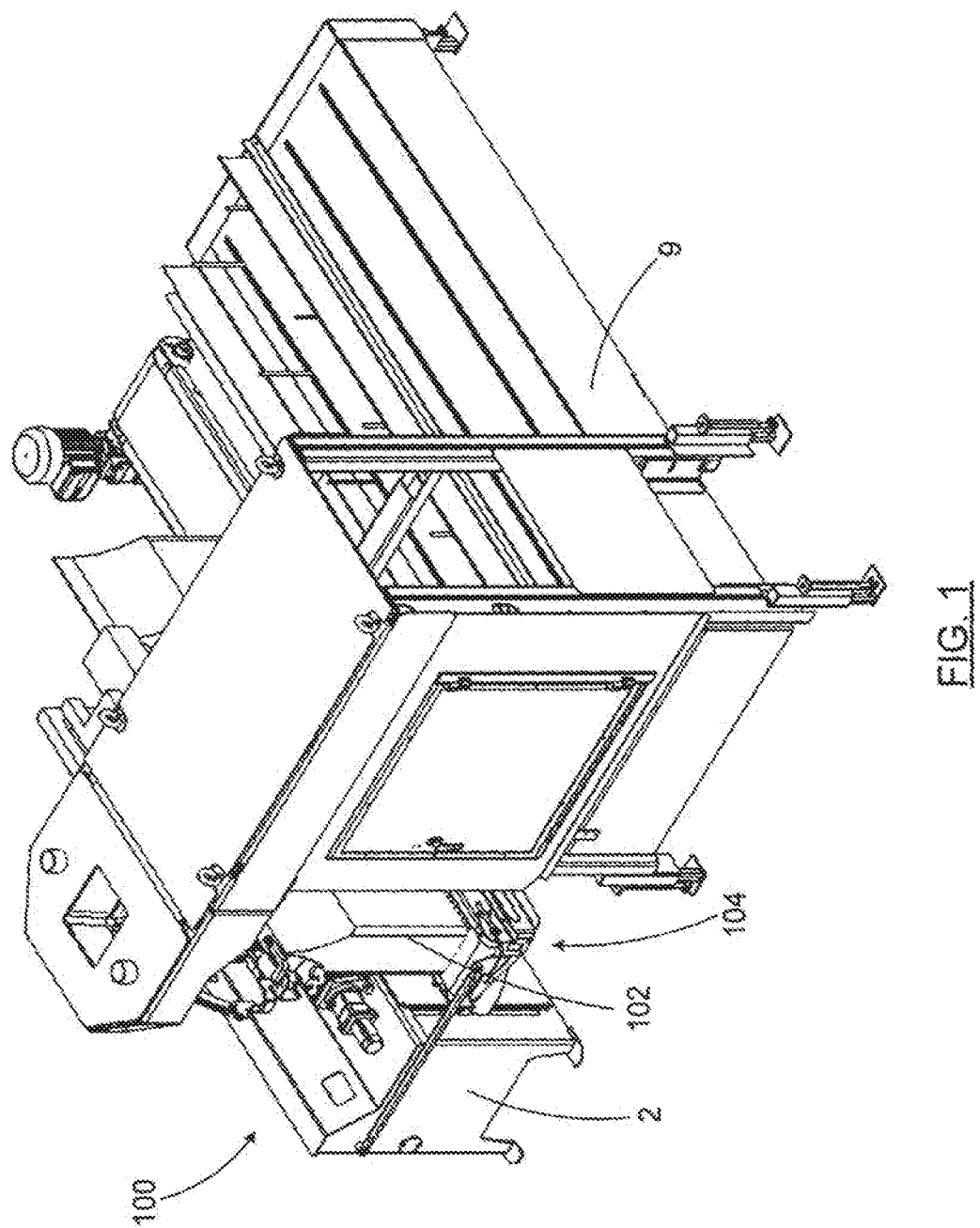
FIG. 1 is a perspective view of the system according to a preferred embodiment of the present invention.
Figure 2:
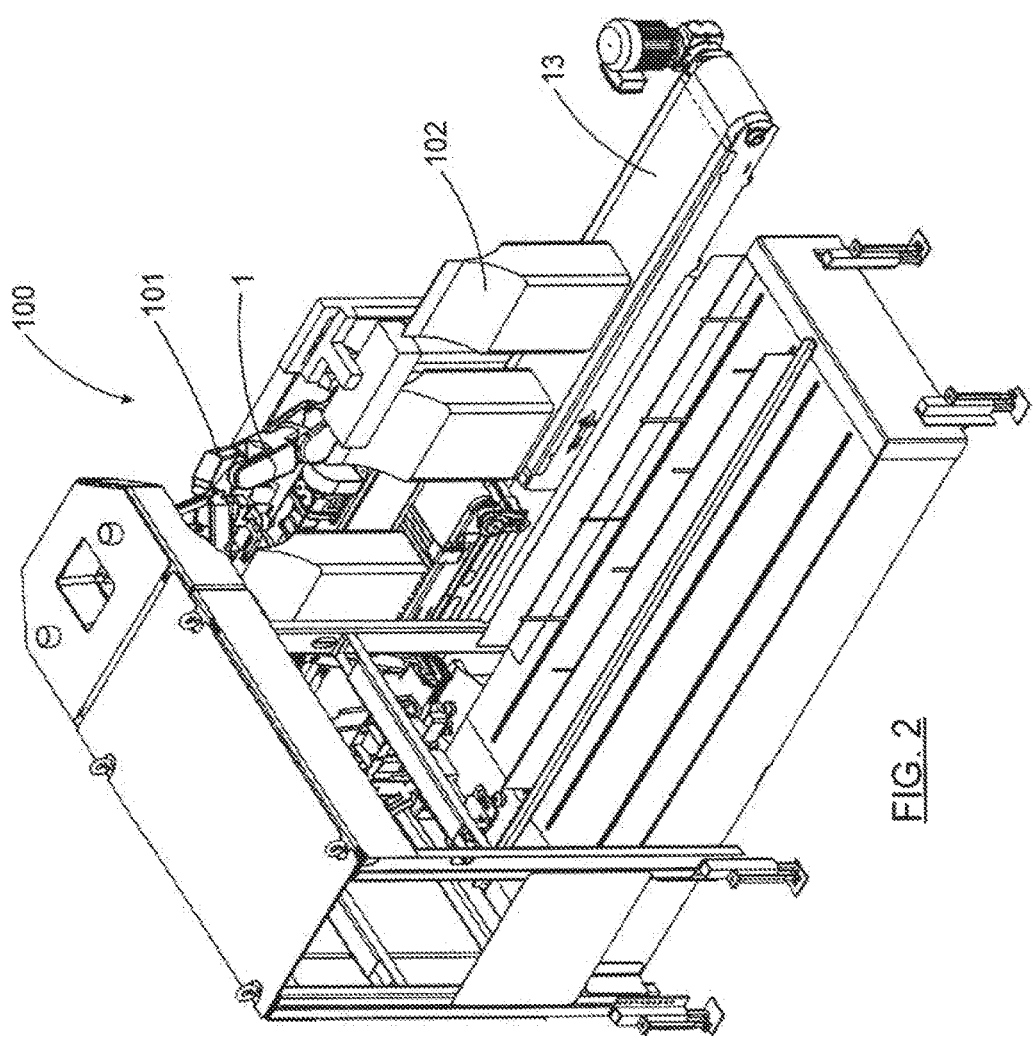
FIG. 2 is another perspective view of the system shown in FIG. 1.

As shown in FIGS. 1 to 8, the present invention provides a system (100) for transferring and transporting a flexible package (102). The system (100) includes a multi-axis robot (101) for transferring and displacing the flexible package (102) between a first position (namely a filling point) and a second position (namely a closing point). The system also includes a lift-assist platform (104) for transporting the flexible package (102). The lift-assist platform (104) substantially supports a weight of the flexible package (102). The lift-assist platform (104) comprises a displacing system (4) for displacing and supporting the flexible package (102) upright between the first and second positions. The platform (104) is positioned within reach of the multi-axis robot (101).

Preferably, the multi-axis robot (101), in certain configurations, maintains the flexible package (102) between the first position and the second position.

Preferably, the system (100) comprises a central controller (3) for synchronizing motion of the multi-axis robot (101) and the lift-assist platform (104).

Preferably, the multi-axis robot (101) is a five axis robot (1).

Preferably, the multi-axis robot (101) comprises a gripper (8) continuously maintaining a shape of at least a portion of a top of the flexible package (102) between the first and second positions.

Preferably, the gripper (8) comprises opposite side clamps (108) for grasping the flexible package (102). One of the opposite side clamps acts like an opposable thumb simulating the movement of a human hand for better manipulation of the flexible package.

Preferably, the displacing system (4) is a conveyor system (4).

According to the present invention, there is also provided a method for transferring and transporting a flexible package (102), comprising the steps of:

a) providing a system (100) comprising:

a multi-axis robot (101) for transferring and displacing the flexible package (102) between a first position and a second position;

a lift-assist platform (104) for transporting the flexible package (102), the lift-assist platform substantially supporting a weight of the flexible package (102), the lift-assist platform (104) comprising a displacing system (4) for displacing and supporting the flexible package (102) upright between the first and second positions, the platform (104) being positioned within reach of the multi-axis robot;

a semi-automatic bagger (9) proximate the first position for filling the upright flexible package (102); and a closing system (7) positioned proximate the second position;

b) filling the flexible package (102) with a substance, using the semi-automatic bagger (9);

c) bringing together sidewalls of a top of the filled flexible package (102) in a package-closing configuration with the semi-automatic bagger (9);

d) raising the lift-assist platform (104) to substantially support the weight of the filled flexible package (102);

e) grasping and maintaining a shape of the top of the filled flexible package (102) in the package-closing configuration with the multi-axis robot (101);

f) releasing the filled flexible package (102) from the semi-automatic bagger (9);

g) displacing the filled flexible package (102) towards an inlet of the closing system (7), through synchronized motion of the multi-axis robot (101) and the lift-assist platform (104), the displacing system (4) of the lift-assist platform (104) displacing the flexible package (102) laterally towards the closing system (7);

h) aligning the top of the flexible package (102) with the inlet of the closing system (7); and i) transferring the flexible package (102) from the multi-axis robot (101) to the closing system (7).

Preferably, the flexible package (102) is a bag (10) and the robot (1) continuously maintains an upper part of the bag (10).

Figure 3:
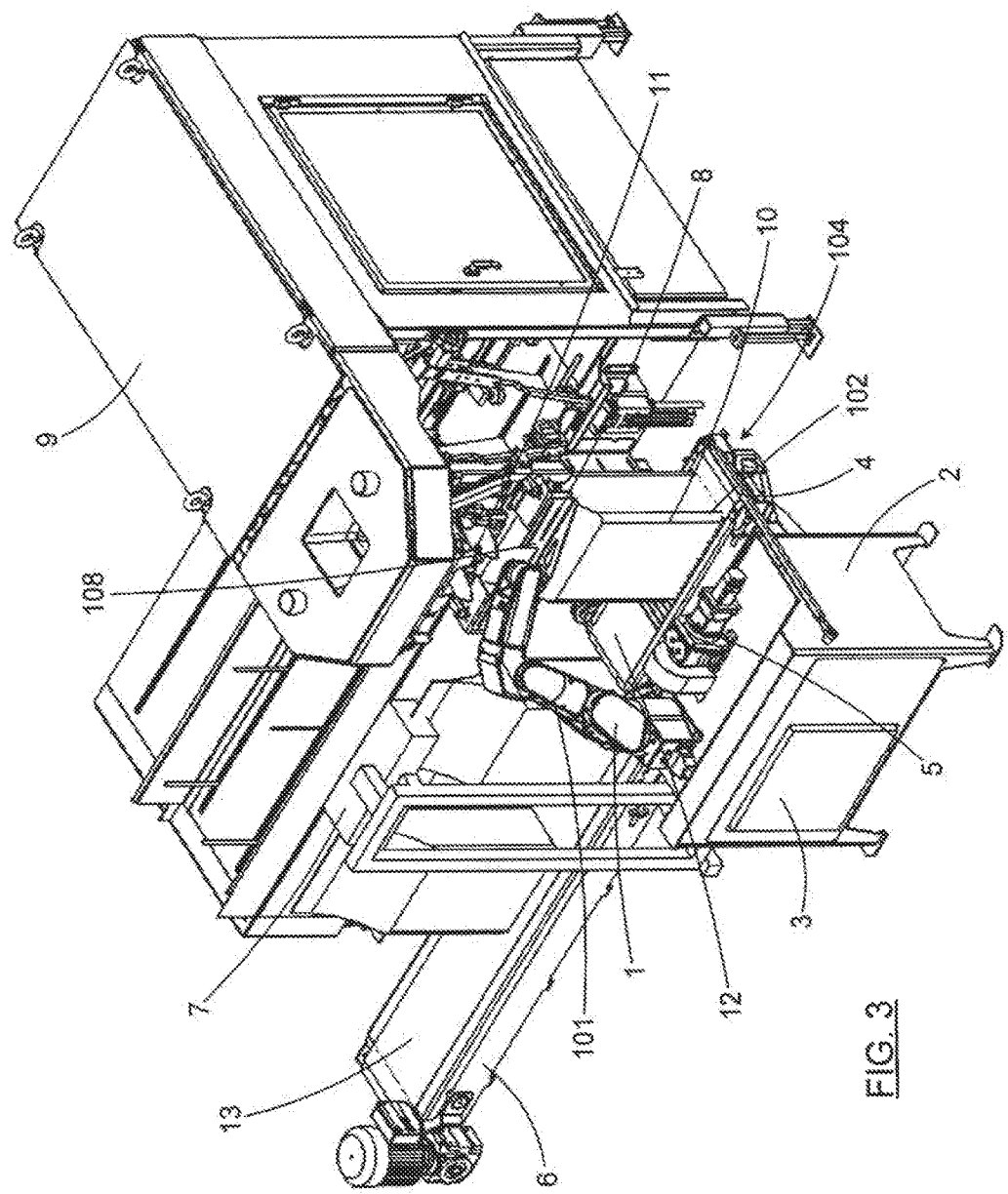
FIG. 3 is another perspective view of the system shown in FIG. 1.
Figure 4:
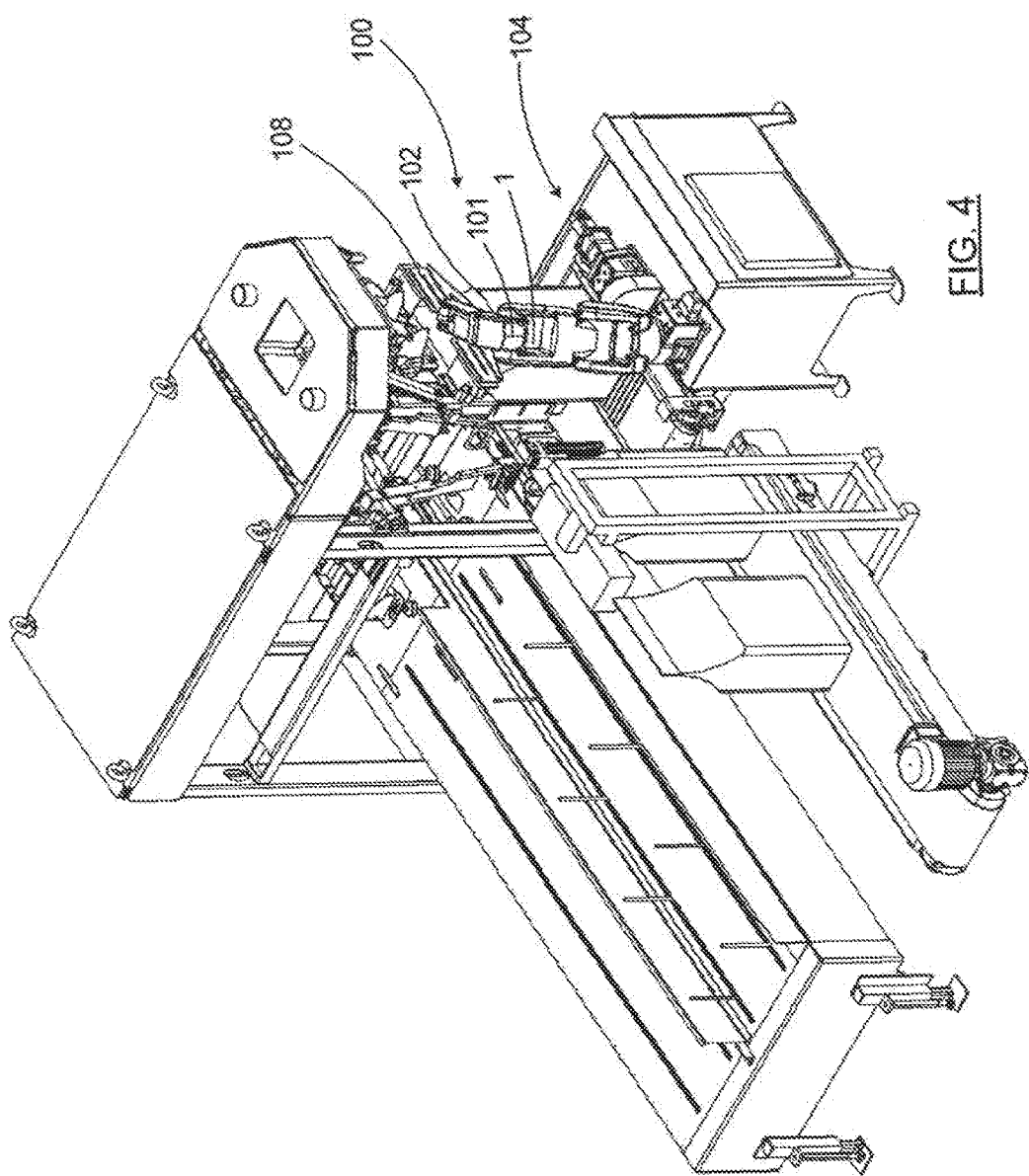
FIG. 4 is another perspective view of the system shown in FIG. 1.
Figure 5:
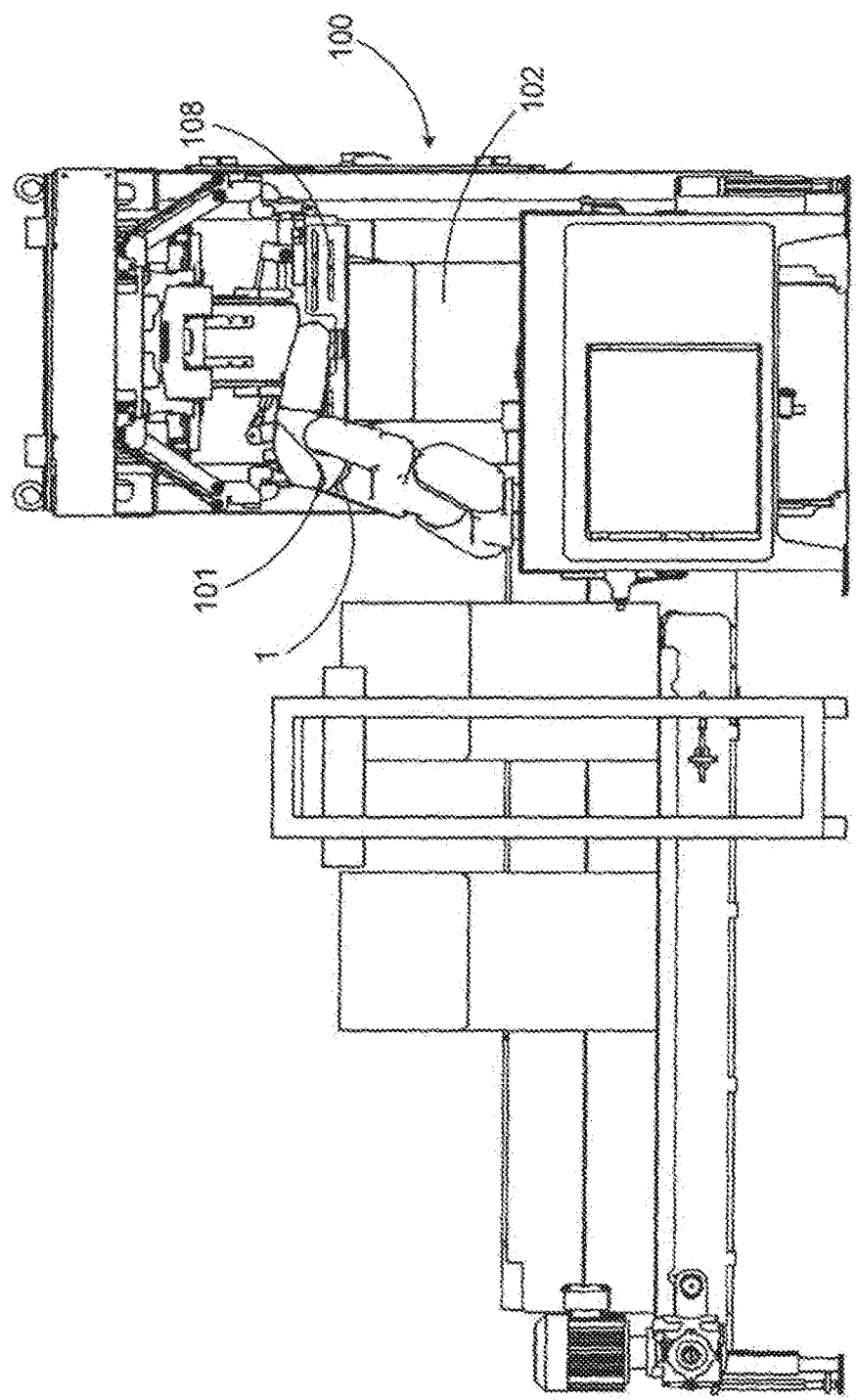
FIG. 5 is a front view of the system shown in FIG. 1.
Figure 6:
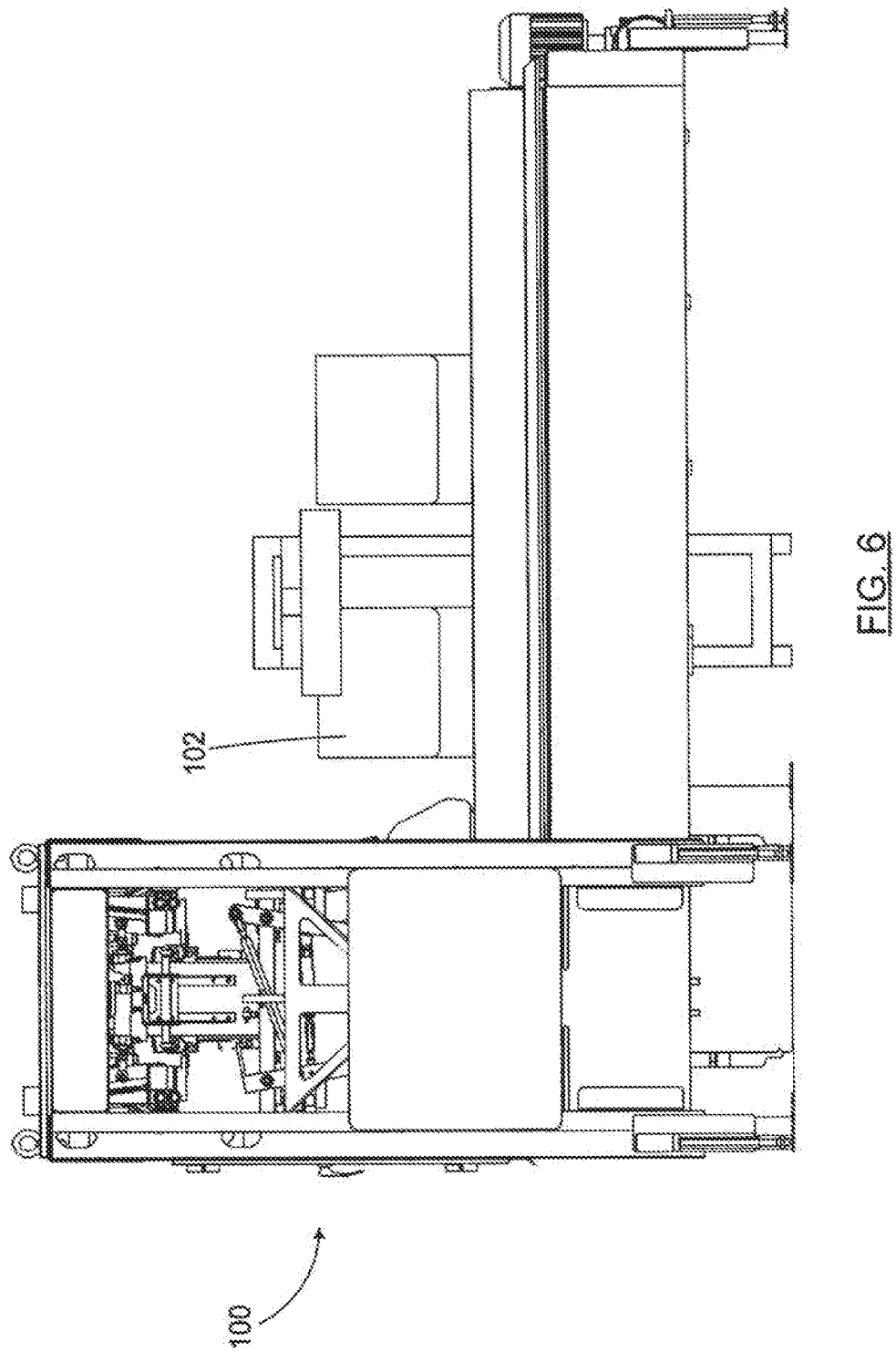
FIG. 6 is a back view of the system shown in FIG. 1.
Figure 7:
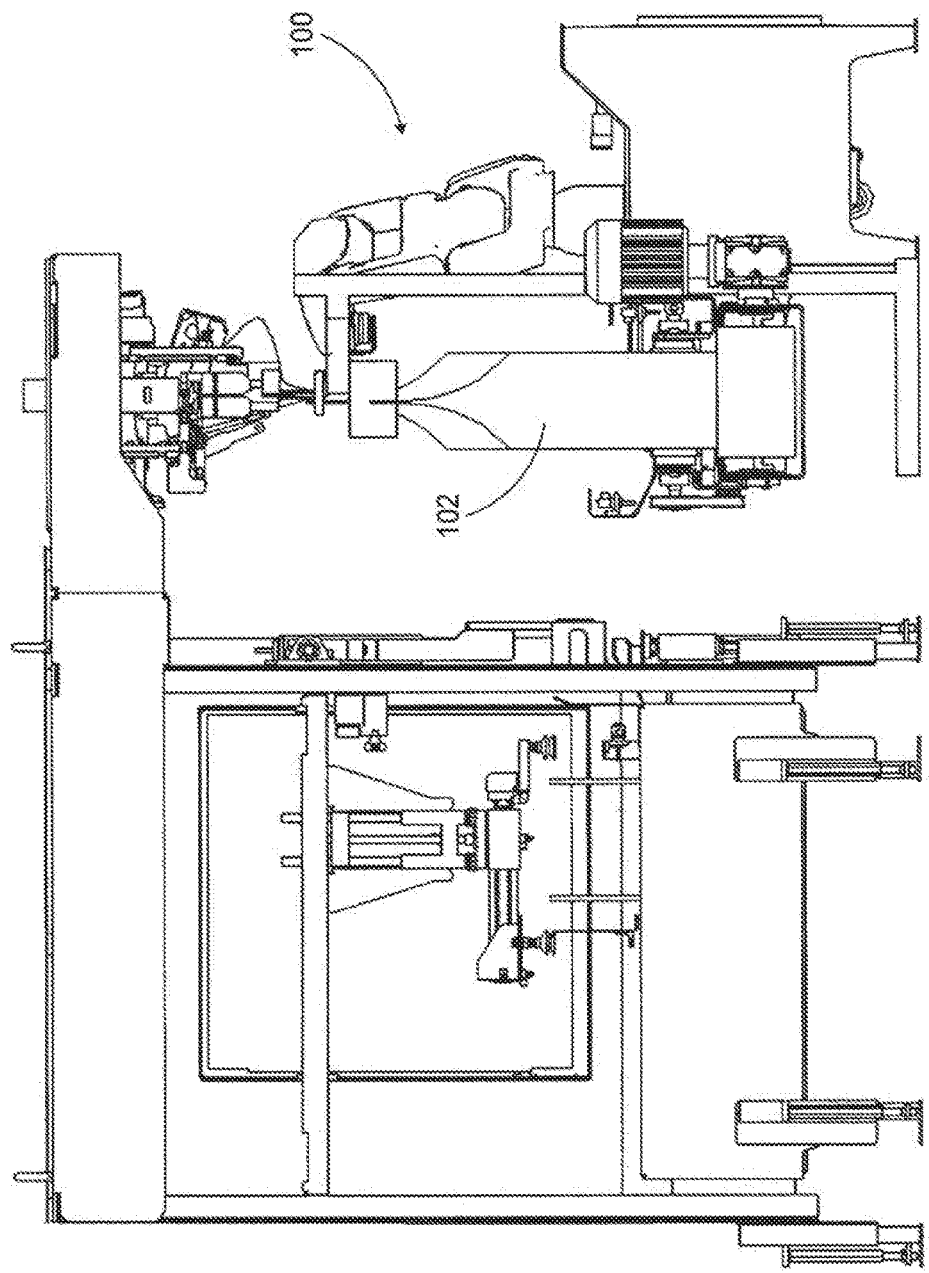
FIG. 7 is a left side view of the system shown in FIG. 1.

As better shown in FIG. 3, in a preferred embodiment of the invention, a robot (1) with a gripper (8) is placed on a support (2) which holds the controller (3). The platform (102) is preferably a support conveyor (4) (also referred to technically as a peripheral axis) mounted on the support (2). A servomotor (5) drives the up/down movement of the support conveyor (4). An exit conveyor (6) is located next to the support conveyor (4). A closing system (7) (preferably a sewing machine) is located over the exit conveyor (6). A semi-automatic bagger (9) is placed in front of the support conveyor (4).

Description of an Operational Cycle:

The system preferably operates according to the following steps:

A filled bag (10) is ready at the spout (11) of the semi-automatic bagger (9);

Sidewalls of the top of the filled bag are brought together in a package-closing configuration and the gussets are shaped by the spout of the bagger;

The support conveyor (4) raises to support the weight of the filled bag (10) while the robot (1) moves to grab the top of the filled bag (10);

The spout (11) releases the filled bag;

Using its gripper (8), the robot (1) maintains the shape of the top of the filled bag (10) and keeps it vertical;

In a synchronous motion, the support conveyor (4) moves down, the belt (12) of the support conveyor (4) starts moving to transfer laterally the bag to the closing system (7) and the robot (1), using its gripper (8), aligns the top of the bag (10) and transfers it to the closing system (7).

In one preferred embodiment of the present invention, the closing system (7) is a sewing machine which is an assembly of driving belts and a sewing head. The driving belts are used to support the top of the bag closed and drive the top of the bag at the correct speed to perform a good stitching. However, the closing system may use any number of different closing methods including adhesives, stitching, stapling, sealing, or adding a closure member, among others.

Preferably, when the bag (10) is being transferred to the closing system (7), the robot (1) and the belt (12) of the support conveyor (4) move at the same speed as the driving belts of the closing system.

Preferably, when the bag is transferred to the closing system, the bottom of the filled bag rests on an exit conveyor (6) adjacent to the support conveyor (4). The belt (13) of the exit conveyor (6) also moves at the same speed of the driving belts of the closing system (7).

The addition of the platform with a support conveyor in combination with the five axis robot results in a reduction in the required capabilities of the robot as it no longer has to be designed to support the weight of the items or bags being manipulated. The robot simply has to be designed for the specific manipulation operations it has carried out. This reduction in the required capabilities of the robot through the addition of the platform results in cost savings since a simpler robot may be used for the application.

As mentioned above, the system according to the present invention can be provided as a module that can then be retrofitted to an existing bagger and closing systems.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A system for transporting a filled flexible package, having a top with an open mouth and a bottom, towards a flexible package closing system, the system comprising:
    a displacing system comprising:
        a support conveyor receiving the bottom of the filled flexible package and supporting a substantial portion of a weight of the filled flexible package during lateral displacement thereof towards a second position in an upright configuration, and
        a vertical motion assembly to selectively raise and lower at least a portion of the support conveyor respectively towards and away from the bottom of the filled flexible package located at a first position, the first position being vertically and laterally spaced-apart from the second position;
    a multi-axis robot having a gripper configured to grasp the top of the filled flexible package at the first position and maintain the top of the filled flexible package during displacement thereof towards the second position; and
    a controller operatively connected to and synchronizing motion of the vertical motion assembly, the support conveyor, and the multi-axis robot.

2. The system as claimed in claim 1, wherein at least a portion of the support conveyor further comprises a flexible package receiving surface and the vertical motion assembly selectively raises and lowers the flexible package receiving surface towards into contact with and away from contact with the bottom of the filled flexible package at the first position, the flexible packaging receiving surface supporting the substantial portion of the weight of the filled flexible package when in contact therewith at the first position.

3. The system as claimed in claim 2, wherein the gripper is mounted above the flexible package receiving surface and maintains the top of the filled flexible package during displacement and transfer thereof towards the second position.

4. The system as claimed in claim 1, wherein the controller synchronizes the multi-axis robot with a respective displacement of each of the vertical motion assembly and the support conveyor.

5. The system as claimed in claim 1, wherein the first position is proximate to a flexible package filling unit configured to fill the flexible package.

6. The system as claimed in claim 1, wherein the gripper maintains a shape of the top of the filled flexible package between the first position and the second position.

7. A system for transporting a filled flexible package, having a top with an open mouth and a bottom, towards a flexible package closing system, the system comprising:
    a lift-assist platform comprising a vertical motion assembly and being displaceable vertically towards and into contact with the bottom of the filled flexible package located at a first position;
    a support conveyor receiving the bottom of the filled flexible package and supporting a substantial portion of a weight of the filled flexible package, in an upright configuration, during lateral displacement thereof towards a second position, the second position being vertically and laterally spaced-apart from the first position;
    a multi-axis robot having a gripper configured to grasp the top of the filled flexible package at the first position and maintain the top of the filled flexible package during displacement thereof towards the second position; and
    a controller operatively connected to and synchronizing motion of the lift-assist platform and the multi-axis robot.

8. The system as claimed in claim 7, wherein the lift-assist platform further comprises a flexible package receiving surface operatively connected to the vertical motion assembly and the vertical motion assembly selectively raises and lowers the flexible package receiving surface toward into contact with and away from contact with the bottom of the filled flexible package at the first position, the flexible package receiving surface supporting the substantial portion of the weight of the filled flexible package when in contact therewith at the first position.

9. The system as claimed in claim 7, wherein the controller synchronizes the multi-axis robot with a displacement of the lift-assist platform.

10. The system as claimed in claim 7, wherein the first position is proximate to a flexible package filling unit configured to fill the flexible package.

11. The system as claimed in claim 7, wherein the gripper is mounted above the lift-assist platform and maintains the top of the filled flexible package during displacement and transfer thereof towards the second position.

12. The system as claimed in claim 7, wherein the gripper maintains a shape of the top of the filled flexible package between the first position and the second position.

13. A system for transporting a filled flexible package, having a top with an open mouth and a bottom, towards a flexible package closing system, the system comprising:

a displacing system comprising:
- a support conveyor receiving the bottom of the filled flexible package and supporting a substantial portion of a weight of the filled flexible package during lateral displacement thereof towards a second position in an upright configuration, and
- a vertical motion assembly selectively raisable towards a bottom of the filled flexible package located at a first position, the first position being vertically and laterally spaced-apart from the second position;

a multi-axis robot having a gripper configured to grasp the top of the filled flexible package at the first position and maintain the top of the filled flexible package during displacement towards the second position; and a controller operatively connected to and synchronizing motion of the vertical motion assembly, the support conveyor, and the multi-axis robot.

14. The system as claimed in claim 13, wherein the vertical motion assembly comprises a flexible package receiving surface being selectively raisable toward into contact with and lowerable away from contact with the bottom of the filled flexible package at the first position, the flexible package receiving surface supporting the substantial portion of the weight of the filled flexible package when in contact therewith at the first position.

15. The system as claimed in claim 14, wherein the gripper is mounted above the flexible package receiving surface and maintains the top of the filled flexible package during displacement and transfer thereof towards the second position.

16. The system as claimed in claim 13, wherein the controller synchronizes the multi-axis robot with a respective displacement of each of the vertical motion assembly and the support conveyor.

17. The system as claimed in claim 13, wherein the first position is proximate to a flexible package filling unit configured to fill the flexible package.

18. The system as claimed in claim 13, wherein the gripper maintains a shape of the top of the filled flexible package between the first position and the second position.

* * * * *